(12) United States Patent
Ozgun et al.

(10) Patent No.: US 8,121,561 B2
(45) Date of Patent: Feb. 21, 2012

(54) POWER TUNING SYSTEM AND METHOD FOR POWER AMPLIFIER

(75) Inventors: Mehmet T. Ozgun, Plano, TX (US); Luis E. Ossa, Plano, TX (US); Brian P. Ginsburg, Allen, TX (US); Srinath M. Ramaswamy, Murphy, TX (US); Zahir I. Parkar, Bangalore (IN)

(73) Assignee: Texas Instruments Incorporated, Dallas, TX (US)

( * ) Notice: Subject to any disclaimer, the term of this patent is extended or adjusted under 35 U.S.C. 154(b) by 236 days.

(21) Appl. No.: 12/683,012

(22) Filed: Jan. 6, 2010

(65) Prior Publication Data

US 2010/0172435 A1 Jul. 8, 2010

Related U.S. Application Data

(60) Provisional application No. 61/142,934, filed on Jan. 7, 2009.

(51) Int. Cl.
*H04B 1/04* (2006.01)

(52) U.S. Cl. .................. 455/125; 455/127.1; 455/127.2; 455/115.1; 455/123; 330/129

(58) Field of Classification Search .................. 455/125, 455/127.1, 127.2, 115.1, 123; 330/129
See application file for complete search history.

(56) References Cited

U.S. PATENT DOCUMENTS

| | | | | |
|---|---|---|---|---|
| 5,150,075 | A * | 9/1992 | Hietala et al. | 330/279 |
| 5,376,895 | A * | 12/1994 | Aihara | 330/129 |
| 2003/0206057 | A1 * | 11/2003 | Genest | 330/129 |

* cited by examiner

*Primary Examiner* — Sanh Phu
(74) *Attorney, Agent, or Firm* — Ronald O. Neerings; Wade James Brady, III; Frederick J. Telecky, Jr.

(57) ABSTRACT

An automatic power tuning system and method, and a transmitter employing either the system or the method. In one embodiment, the system includes: (1) a power detector circuit coupled to an output of a transmitter, the transmitter having an integrator with a first, reference integrator current power control input, a second, integrator capacitor power control input and a plurality of driver fingers selectably employable by a third, driver finger power control input, the power detector configured to generate signals indicating an output voltage of the transmitter and (2) a digital processing circuit coupled to the power detector circuit and configured to employ the signals to determine at least near-optimum reference integrator current and integrator capacitor settings and select a number of driver fingers to employ to drive the output voltage.

20 Claims, 6 Drawing Sheets

POWER TUNING SYSTEM AND METHOD FOR POWER AMPLIFIER

CROSS-REFERENCE TO RELATED APPLICATION

This application claims the benefit of U.S. Provisional Application Ser. No. 61/142,934, filed by Ozgun, et al., on Jan. 7, 2009, entitled "Automatic Power Tuning System and Method for FM Power Amplifier," commonly assigned with this application and incorporated herein by reference.

TECHNICAL FIELD

This application is directed, in general, to radio transmitters and, more specifically, to a power tuning system and method for a power amplifier.

BACKGROUND

Government regulations strictly limit the transmit power of unlicensed transmitters so they do not interfere with licensed transmitters. Unfortunately, transmit power is dependent upon antenna impedance and efficiency which themselves vary when environmental changes occur. Furthermore, the quality of the transmitted signal is subject to change as a function of the number of unlicensed and licensed transmitters transmitting on the same frequency. As a result, the resulting transmit power occasionally drops below what regulations allow, and the range needlessly suffers as a consequence. It is therefore desirable to increase the transmitted power and thereby increase the quality of the transmitted signal under these, and perhaps other, conditions.

Modern transmitters for mobile terminals (e.g., phones) are particularly designed to use printed loop antennas or electrically small antennas. Unfortunately, the gains of these kinds of antennas tend to vary substantially from one transmitter to another and widely as a function of frequency. Further, the performance of both the antenna and the power amplifier in the transmitter has some temperature dependency.

SUMMARY

One aspect provides an automatic power tuning system. In one embodiment, the system includes: (1) a power detector circuit coupled to an output of a transmitter, the transmitter having an integrator with a first, reference integrator current power control input, a second, integrator capacitor power control input and a plurality of driver fingers selectably employable by a third, driver finger power control input, the power detector configured to generate signals indicating an output voltage of the transmitter and (2) a digital processing circuit coupled to the power detector circuit and configured to employ the signals to determine at least near-optimum reference integrator current and integrator capacitor settings and select a number of driver fingers to employ to drive the output voltage.

Another aspect provides an automatic power tuning method. In one embodiment, the method includes: (1) setting a modulator of a transmitter to a channel frequency, (2) fixing integrator capacitor settings in the transmitter and matching network capacitor settings in a power detector circuit, (3) setting an initial output voltage target value, (4) setting an attenuation ratio capable of achieving the initial output voltage target value, (5) determining an optimum driver setting to achieve the output voltage target value and (6) determining an optimum reference integrator current setting for the transmitter based on the output voltage target value and the optimum driver setting.

Another aspect provides a transmitter. In one embodiment, the transmitter includes: (1) a modulator, (2) a charge-pump based integrator coupled to the modulator and including a first, reference integrator current power control input and a second, integrator capacitor power control input, (3) a notch filter coupled to the charge-pump based integrator, (4) a power amplifier coupled to the notch filter, including a plurality of driver fingers selectably employable by a third, driver finger power control input and having an output, (5) a power detector circuit coupled to the output and configured to generate signals indicating an output voltage of the power amplifier and (6) a digital processing circuit coupled to the power detector circuit and configured to employ the signals to determine at least near-optimum settings for the first, reference integrator current power control input, the second, integrator capacitor power control input and the third, driver finger power control input.

BRIEF DESCRIPTION

Reference is now made to the following descriptions taken in conjunction with the accompanying drawings, in which.

DETAILED DESCRIPTION

Figure 1A:
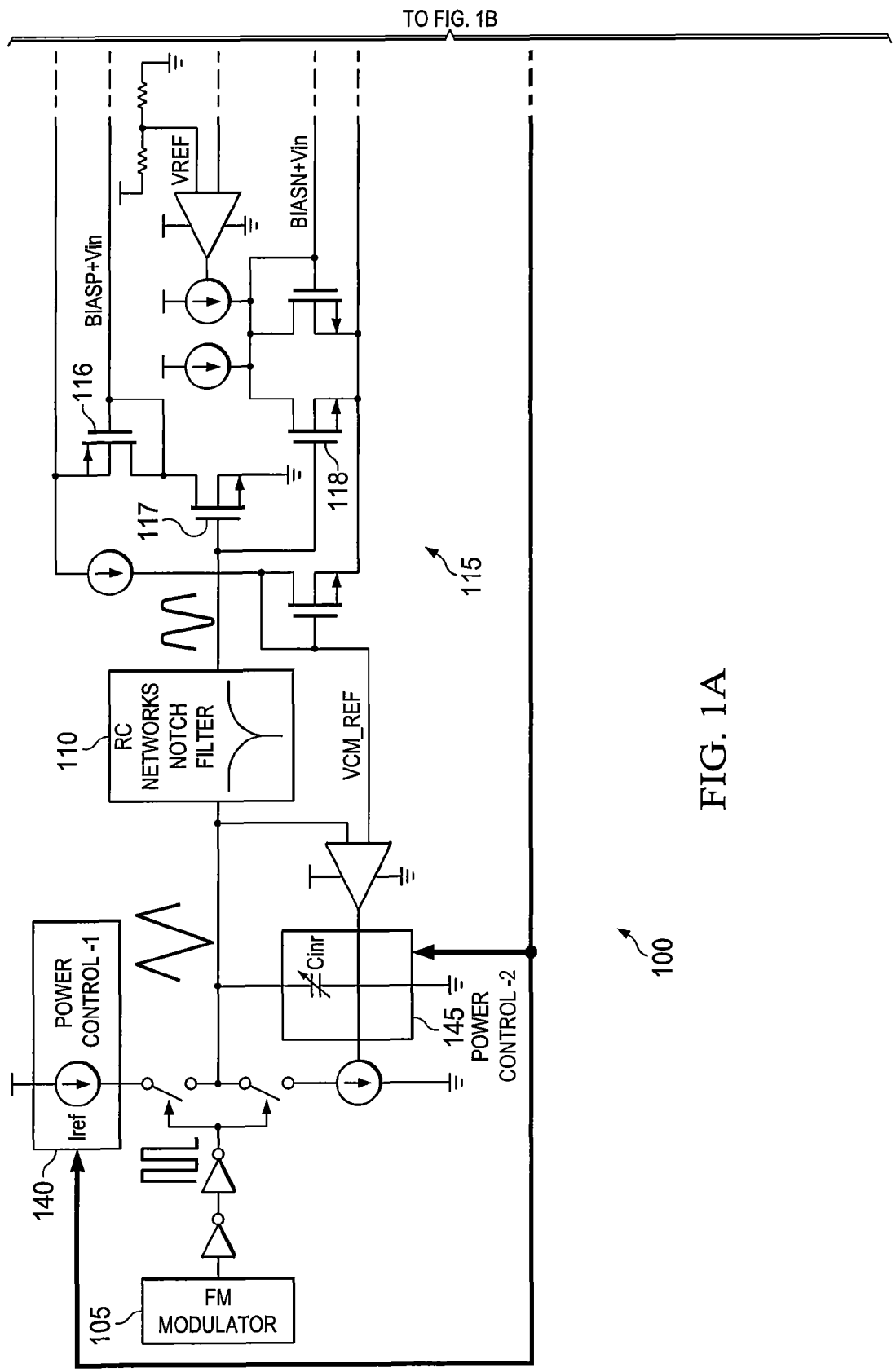
FIG. 1 is a diagram of one embodiment of a frequency modulation (FM) power amplifier of an FM transmitter along with one embodiment of an automatic power tuning system.

As stated above, modern transmitters (e.g., FM transmitters) for mobile terminals (e.g., phones) are designed to use antennas having frequency-dependent gains that vary from one transmitter to another. Such transmitters also have some temperature dependency. Thus, it is advantageous to provide a power tuning system and method that can at least partially compensate for frequency-dependent and temperature-dependent performance changes.

Certain FM transmitters, certain embodiments of which to be described in greater detail below, have three uncorrelated control inputs that control their output power. One provides relatively coarse gain settings, and the other two provide relatively fine gain settings. Different combinations of these three control inputs can give the same output power. In theory, one equation with three unknowns has an infinite number of solutions. However, it is advantageous to optimize two performance parameters, power and linearity, while calibrating the output power. Thus, various embodiments of a power calibration system and method carried out as described herein automatically set these three control inputs to improve performance and at least approximately achieve the required output power. Various of the embodiments described herein provide one or more of the following features:

a. a relatively wide-range power tuning system and method configured to calibrate the output power of a power amplifier, b. a power tuning system and method configured to calibrate the output power of a power amplifier, and c. a power tuning system and method that improve the performance (e.g., measured in terms of linearity and power consumption) of the power amplifier and, in some embodiments, ensure the best performance (i.e., maximum linearity and minimum power consumption at a desired output power level) out of the amplifier.

As stated above and described in greater detail below, an example power amplifier has three different control inputs that may be employed to control the output voltage of the power amplifier. The power tuning system and method described herein may be employed to tune these inputs and change the operation of the power amplifier such that it can concurrently satisfy two design constraints. Furthermore, since antenna characteristics may change significantly with environment and temperature as described above, the power tuning system and method may be carried out repeatedly (i.e., adaptively or automatically) such that the output voltage of the power amplifier remains within the required voltage levels.

Certain embodiments described herein provide a relatively wide-range power tuning system capable of calibrating the output power of a power amplifier. Certain other embodiments provide an automatic/adaptive tuning method capable of calibrating the output power of the power amplifier as the environment changes. Still other embodiments provide a tuning method that at least approaches the best performance that can be attained from the amplifier, i.e., near-maximum, if not maximum, linearity and near-minimum, if not minimum, power consumption, while ensuring the required output power level.

Various embodiments of the tuning system and method provide a power tuning range that is wide enough to accommodate different types of antennas having different efficiencies and yet still calibrate transmitter output power to comply with government regulations. Various other embodiments accurately tune output power to allow the resulting transmit signal to be as high as possible and still comply with government regulations. Because loop antenna impedance typically varies significantly as a function of environmental changes, various embodiments of the tuning system and method are capable of automatically adjusting power level according to the antenna impedance. Various of those embodiments do so without interrupting the transmit signal. Still other embodiments provide an optimum solution for calibrating multiple control inputs such that a near-minimum nonlinearity and near-maximum efficiency may be achieved. Various embodiments are capable of performing such calibration in at most 30 ms. Finally, various embodiments hold power amplifier leakage power in the GSM (Global System for Mobile communications) band to within its limit (currently about −109 dBm).

In various embodiments to be illustrated and described, a tuning system provides three control outputs (called "Power Control-1," "Power Control-2" and "Power Control-3" for purposes of the discussion herein) that provide signals to three respective control inputs on an FM transmitter.

In many of those embodiments, Power Control-1 changes the output power of the FM transmitter by changing the reference current of a charge-pump based integrator. In one embodiment, Power Control-1 provides 32 different levels, encoded in a five-bit value. Other embodiments provide different numbers of bits for the value. In that embodiment, Power Control-1 can provide changes in 0.1 dB steps for the final output power.

In other of those embodiments, Power Control-2 changes the output power of the FM transmitter by changing the capacitance in its integrator. In one embodiment, Power Control-2 provides eight levels of capacitance, encoded in a three-bit value. Other embodiments provide fewer or greater numbers of levels as well. However, increasing the numbers of levels may increase parasitic capacitance to an undesirable degree. As those skilled in the pertinent art understand, the output voltage of an integrator in an FM transmitter can vary substantially as a function of frequency. Even the amounts by which the capacitance levels differ from one another can vary substantially as a function of frequency due to changes in reference current. Thus, various embodiments employ searching (e.g., binary searching) in conjunction with Power Control-2 to calibrate the integrator in different frequency bands.

In still other of those embodiments, Power Control-3 changes the output power of the FM transmitter by changing a number of driver fingers ("fingers") that are connected to the output stage of the transmitter. The output stage is typically the most power-consumptive stage in the transmitter. In one embodiment, Power Control-3 provides 16 different numbers of fingers, encoded in a four-bit value. Other embodiments provide different numbers of bits for the value.

In providing power tuning, some overall objectives may be advantageous to achieve. First, the nonlinearity of the FM transmitter system may be desirable to minimize. Accordingly, in some embodiments, voltage adjustments are restrained by restricting Power Control-1 to lower settings and Power Control- 3 to higher settings. Second, the efficiency of the FM transmitter may be desirable to maximize (minimal power consumption) for a given output voltage level. Accordingly, in some embodiments, Power Control-3 settings are reduced, and Power Control-1 settings are increased.

Various of the systems and methods described herein embody the above-described objectives by carrying out the following general process:

1. Initially setting Power Control-1 to a central value, which is optimal both for linearity and efficiency.

2. Determining the closest upper bound setting for Power Control-3 for the required output voltage.

3. Readjusting Power Control-1 to bring the actual output level as close as to the required output voltage level.

Figure 1B:
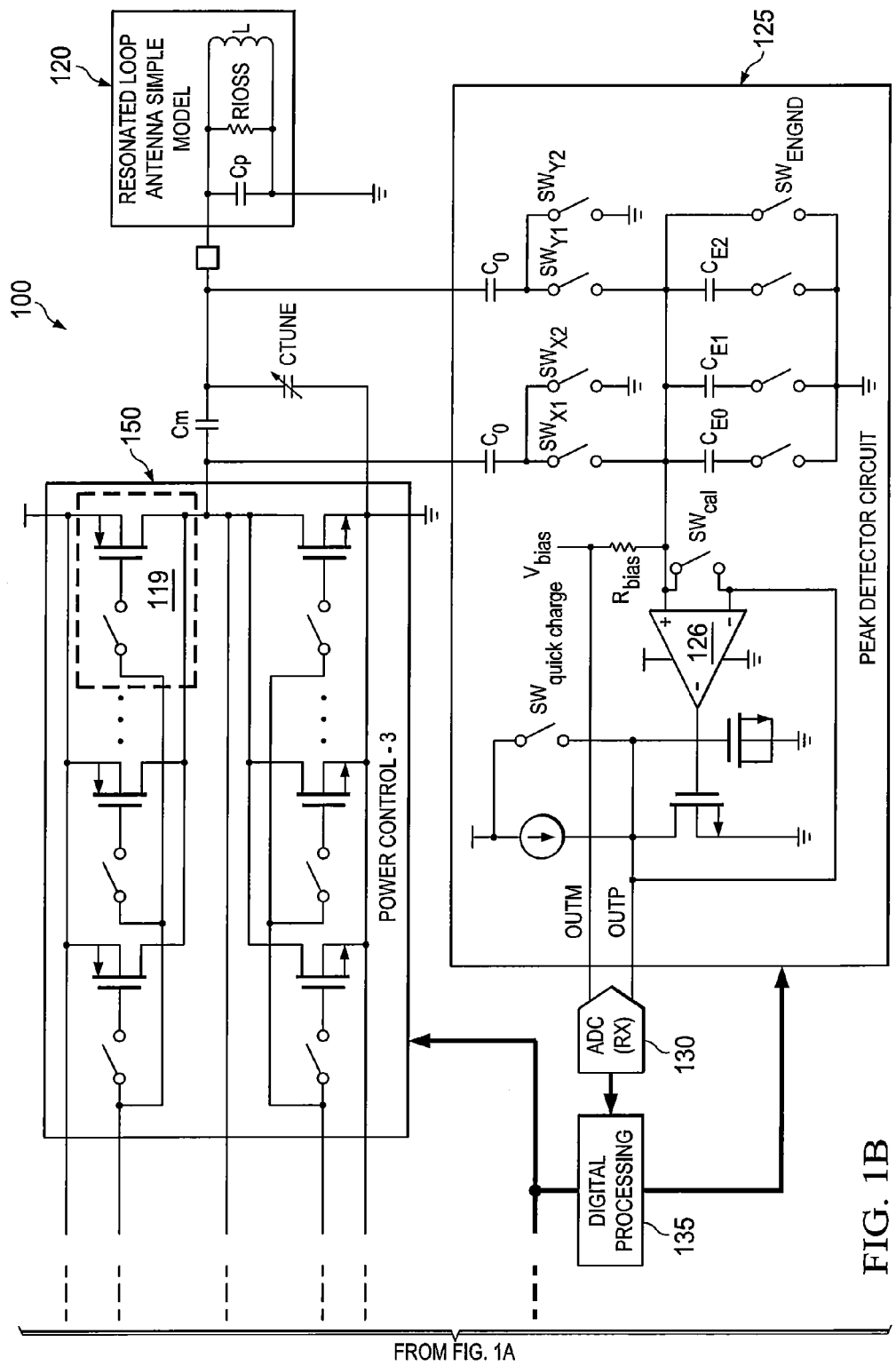

FIG. 1 is a diagram of one embodiment of an FM power amplifier of an FM transmitter 100 along with one embodiment of an automatic power tuning system. The FM transmitter 100 includes an FM modulator 105 that provides a generally square-wave output signal that is provided to a charge-pump based integrator (no separate reference number provided). The integrator employs a charge pump, which includes a current source and sink (no separate reference numbers provided), and an integrating capacitor Cinr to transform the generally square-wave output signal of the FM modulator 105 to yield a generally triangular wave signal. Cinr is tunable as shown in FIG. 1. A notch filter 110, which in the illustrated embodiment is a resistive-capacitive (RC) network, filters the generally triangular wave signal to yield a generally sinusoidal wave signal. The generally sinusoidal wave signal is then provided to a power amplifier 115, where it is amplified in multiple stages. An early stage has a transconductor including PMOS and NMOS transistors 116, 117, 118, and a subsequent stage including driver fingers (one of which being referenced as 119) that are selectably activatable in a manner that will be described below to provide a configurable gain. The output of the power amplifier 115 is provided to a series capacitor Cm and a tuning capacitor Ctune. Thereafter, the amplified signal is provided to a resonated loop antenna 120 having intrinsic capacitance Cp, resistance Amy and inductance L.

FIG. 1 shows one embodiment of an automatic power tuning system including a peak detector circuit 125 coupled to the output of the power amplifier 115. In the embodiment of FIG. 1, the peak detector circuit 125 is coupled on either side of the series capacitor Cm and the tuning capacitor Ctune through series capacitors $C_0$. The series capacitors $C_0$ behave like AC coupling capacitors, allowing the peak detector circuit 125 to be separately biased. Even though there are two connections to the input of the peak detector circuit 125, only the voltage level at the output of the matching network needs to be sensed for power tuning, as it is the final output.

In the embodiment of FIG. 1, the power amplifier is designed to provide a relatively wide range of output voltage, specifically from 75 mV peak to 1.4 V peak. Consequently, the peak detector circuit 125 employs circuitry configured to reduce the dynamic range at its input. In one embodiment, the circuitry includes an adjustable input capacitor array $C_{E0}$, $C_{E1}$, $C_{E2}$ that cooperate to function as one embodiment of an attenuator and companding system.

The peak detector circuit 125 employs a sense amplifier 126 and a feedback loop to sense the negative peaks of the transmitted signal, yielding differential analog output signals, OUTP and OUTM. These signals are provided in turn to an analog-to-digital converter (ADC) 130, which converts them to digital values and provides the digital values to a digital processing circuit 135.

In the illustrated embodiment, the attenuation ratio enabled by the input capacitor array $C_{E0}$, $C_{E1}$, $C_{E2}$ is controlled digitally and changed as the output voltage level changes. Also, in the illustrated embodiment, the capacitors in the input capacitor array $C_{E0}$, $C_{E1}$, $C_{E2}$ have relatively low values to reduce the loading effect on the output of the power amplifier. Because the accuracy of the overall output voltage level is a function of accuracy of the attenuation ratio, the parasitic capacitance (which is a NPoly-NWell capacitor) at the input of the sense amplifier 126 should be taken into account. Thus, the parasitic capacitance at the input of the sense amplifier 126, is comparable to the values of at least some of the capacitors in the input capacitor array $C_{E0}$, $C_{E1}$, $C_{E2}$, reducing the accuracy of the attenuation ratio. However, the value of the total parasitic capacitance at the sense amplifier 126 input can be estimated by taking two measurements at the same output voltage settings with two different attenuation settings. This allows the attenuation ratios to be determined within some reasonable accuracy.

In the illustrated embodiment, the values of the series capacitors $C_0$ are chosen to be close to the finest capacitor value in the shunt capacitor array $C_{E0}$, $C_{E1}$, $C_{E2}$ to prevent any degradation of the performance of the power amplifier 115. Similarly, the shunt capacitors within the peak detector circuitry may be chosen as multiples of unit capacitors. During the normal operation of the transmitter, switches $SW_{X2}$ and $SW_{Y2}$ may be closed to connect the series capacitors $C_0$ to ground and prevent them floating. Similarly, may be closed to connect the input of the sense amplifier $SW_{ENGND}$ 126 to ground to prevent the shunt capacitor array $C_{E0}$, $C_{E1}$, $C_{E2}$ from floating as well.

In the embodiment of FIG. 1, the ADC 130 is used only for the calibration of the transmitter; it is not engaged in other activities. This is usually the case when the FM transmitter is a half-duplex system and, consequently, the receiver path is not active during the transmit operation. In an alternative embodiment, the ADC 130 is used in other activities during transmitter calibration. This complicates the periodic calibration of the power amplifier during the normal transmit operation. However, this issue will be addressed below.

The digital processing circuit 135 then determines the values to which the three control inputs, Power Control-1 140 (which determines the reference current for the integrator), Power Control-2 145 (which determines the value of the integrating capacitor 145) and Power Control-3 150 (which determines the drive level applied in the subsequent power amplifier stage), should be set and, accordingly, sets the three control inputs to those values. The digital processing circuit 135 also controls the peak detector circuit 125. As will be shown below, the embodiment of the automatic power tuning system illustrated in FIG. 1 employs an iterative process to approach at least near-optimal values for the three control inputs.

The output voltage level of a transmitter can be expressed in the following closed-form Equation (1):

$$Vout = Zant * G(N, Gmn) * V(Iref, Cinr, Frf) \qquad (1)$$

Equation (1) represents the output voltage in terms of antenna impedance (Zant) and the total transconductance (G) and input voltage (V) of the transconductor. The total transconductance G is a function of N (the total number of driver fingers) and Gmn (the transconductance of the NMOS transistor after the notch filter 110). The input voltage of the transconductor is a function of Iref (the total tail current for the charge-pump integrator), Cinr (the output capacitor of the integrator) and IV (the transmit frequency, also known as the frequency of operation). In the architecture described herein, it has been found that changing Gmn is not practical as changing Gmn changes the DC operating point of the charge-pump based integrator's output as well. On the other hand, it has been found that varying the parameters N, Iref and Cinr are practical.

Equation (2) gives the output voltage, Vout, of the charge-pump based integrator.

$$Vout = \int_0^{T/2} \frac{Iref}{Cinr} dt = \int_0^{1/2Frf} \frac{Iref}{Cinr} dt \qquad (2)$$

The output voltage is dependent on three parameters: Iref, Cinr and Frf. Iref and Cinr may be employed for a given transmit frequency to control the output voltage of the integrator. It has been found that varying currents in small amounts in an integrated circuit is more practical than varying the value of integrating capacitor, as parasitics limit the latter. The illustrated embodiment employs a five-bit binary coded current source array in Power Control-1 140 to vary the reference current of the integrator.

As it can be seen from Equation (2), Vout increases as frequency reduces. In theory, the voltage level is 3 dB higher at 76 MHz than the voltage level at 108 MHz for the same values for the current and integrating capacitor. However, the voltage level at 76 MHz is approximately 8 dB higher than the voltage level at 108 MHz due to the loading of filter blocks in the notch filter 110. Similarly, the voltage difference between two consecutive current settings increases as frequency reduces.

To accommodate the difference at the absolute level and difference between two consecutive current settings as frequency changes, the illustrated embodiment employs a three-bit binary coded capacitor as the tunable integrating capacitor Cinr. In general, the value of the capacitor Cinr is increased as frequency of operation is reduced.

The output voltage of the integrator is converted to a current through the NMOS transistor 117. This current is mirrored through the PMOS and NMOS transistors 116, 118 that, in turn, drive PMOS and NMOS driver fingers (e.g., 119) as shown. The total transconductor gain depends on the transconductance of the NMOS transistor 117, the gain of the current mirror circuit (including the PMOS and NMOS transistors 116, 118) and the number of driver fingers (e.g., 119) that are connected to the signal path. As described above, the transconductance of the NMOS transistor 117 that connects the integrator output to the driver fingers' inputs cannot be easily varied, since the DC operating points of the system as a whole depends on the DC operating points of the NMOS transistor 117. Further, increasing internal voltage swings by increasing the transconductance of the NMOS transistor 117 decreases the linearity of the power amplifier 115 as a whole. Thus, only practical variable at the transconductance stage of the power amplifier is the driver array (configured by Power Control-3 150). In the illustrated embodiment, the driver array is a four-bit binary-coded driver array. As is evident in FIG. 1, both PMOS driver fingers and NMOS driver fingers share the same control lines.

As mentioned earlier, Equation (1) in theory has infinite number of solutions, because it has three variables. However, by fixing the value of Cinr for a particular transmit frequency, the number of variables may be reduced to two: Iref and Frf. Still, though one variable has effectively been eliminated, Equation (1) still has two remaining variables and, in theory, an infinite number of solutions.

To evaluate the solutions relative to one another, various embodiments employ two performance parameters to find an optimum setting for Iref and Frf: linearity and amplifier power consumption. If linearity is the primary concern, the optimum solution for moderate output power levels would be to enable all the driver fingers and reducing the reference current of the integrator to get the required output power level. However, while this solution improves linearity by reducing voltage swings in internal nodes of the power amplifier, it comes at a cost of power consumption; driver fingers do consume power. On the other hand, if power consumption is the primary concern, the optimum solution for moderate power levels involves maximizing the reference current for the integrator and enabling the minimum number of driver fingers to provide the required output power level. Unfortunately, linearity suffers as the voltage swings in internal nodes of the power amplifier are increased. To strike an optimum middle ground, the illustrated embodiment takes the following two steps, in order.

1. Reduce voltage swings in the internal nodes of the power amplifier such that the overall nonlinearity of the amplifier is dominated by the nonlinearity of the output impedance and parasitic capacitances of the driver fingers.

2. Reduce power consumption as much as possible while continuing to maintain the nonlinearity dominance of the output impedance and parasitic capacitances of the driver fingers.

Figure 2:
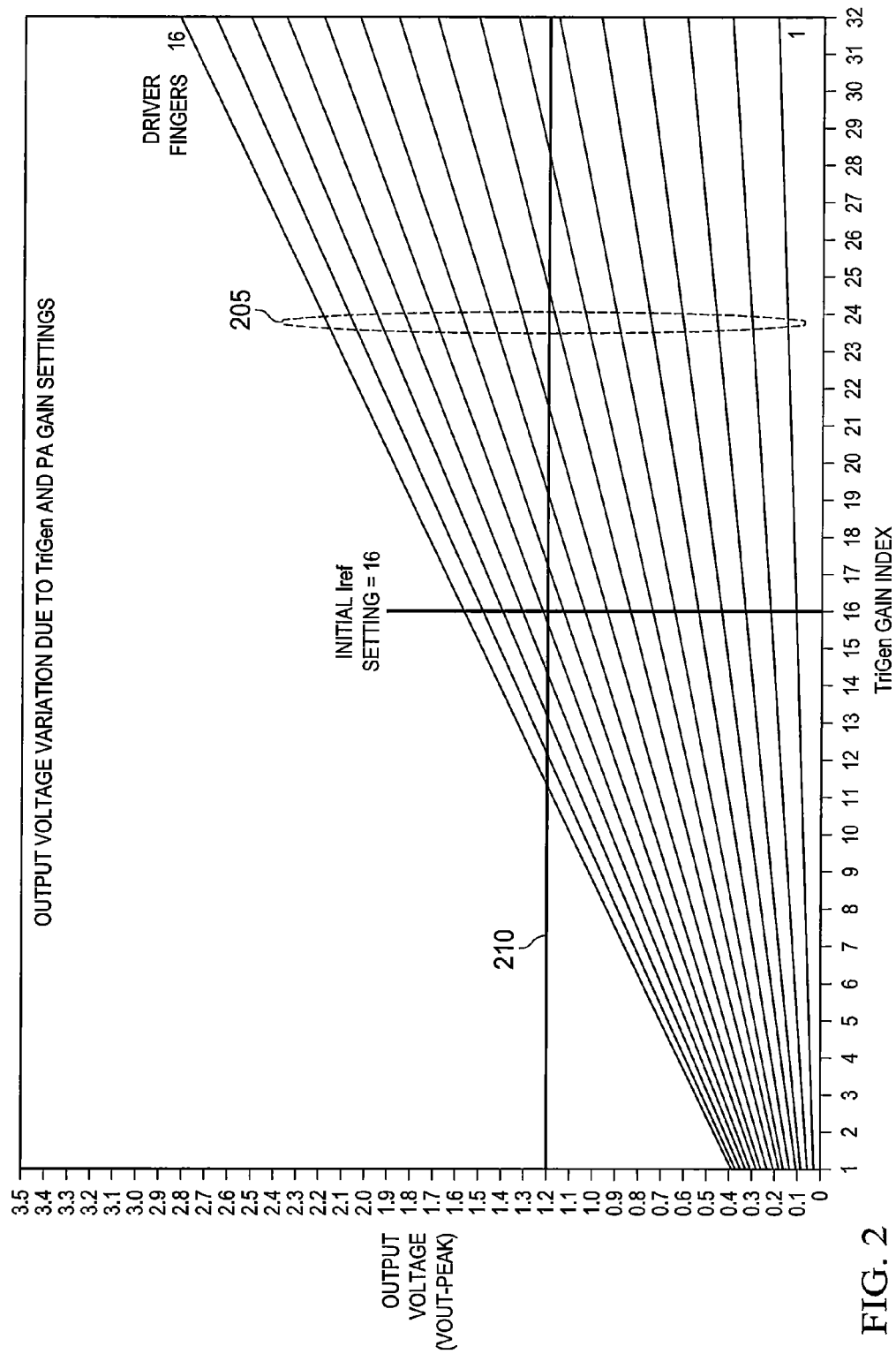
FIG. 2 is a graph of FM power amplifier output voltage swing as a function of reference current settings for an integrator before application of an automatic power amplifier tuning method.

To implement these two steps, the illustrated embodiment calls for Power Control-1 to be initially set to a middle value, and then the closest required voltage settings (that determine how many driver fingers are to be activated) are found by searching. FIG. 2 is a graph of FM power amplifier output voltage swing as a function of Iref gain settings and power amplifier output voltage values before application of an automatic power amplifier tuning method and reflects an example searching. FIG. 2 illustrates a plurality of curves (e.g., straight lines) 205 that represent driver finger numbers to be used under various Iref gain settings and power amplifier output levels. The example of FIG. 2 pertains to a power amplifier having a total of 12 driver fingers. FIG. 2 indicates, for example, that given an initial Iref gain setting of 16 and an output voltage of 1.2 V peak, a curve 210 indicates that six driver fingers should be enabled to maintain the proper output voltage.

Figure 3:
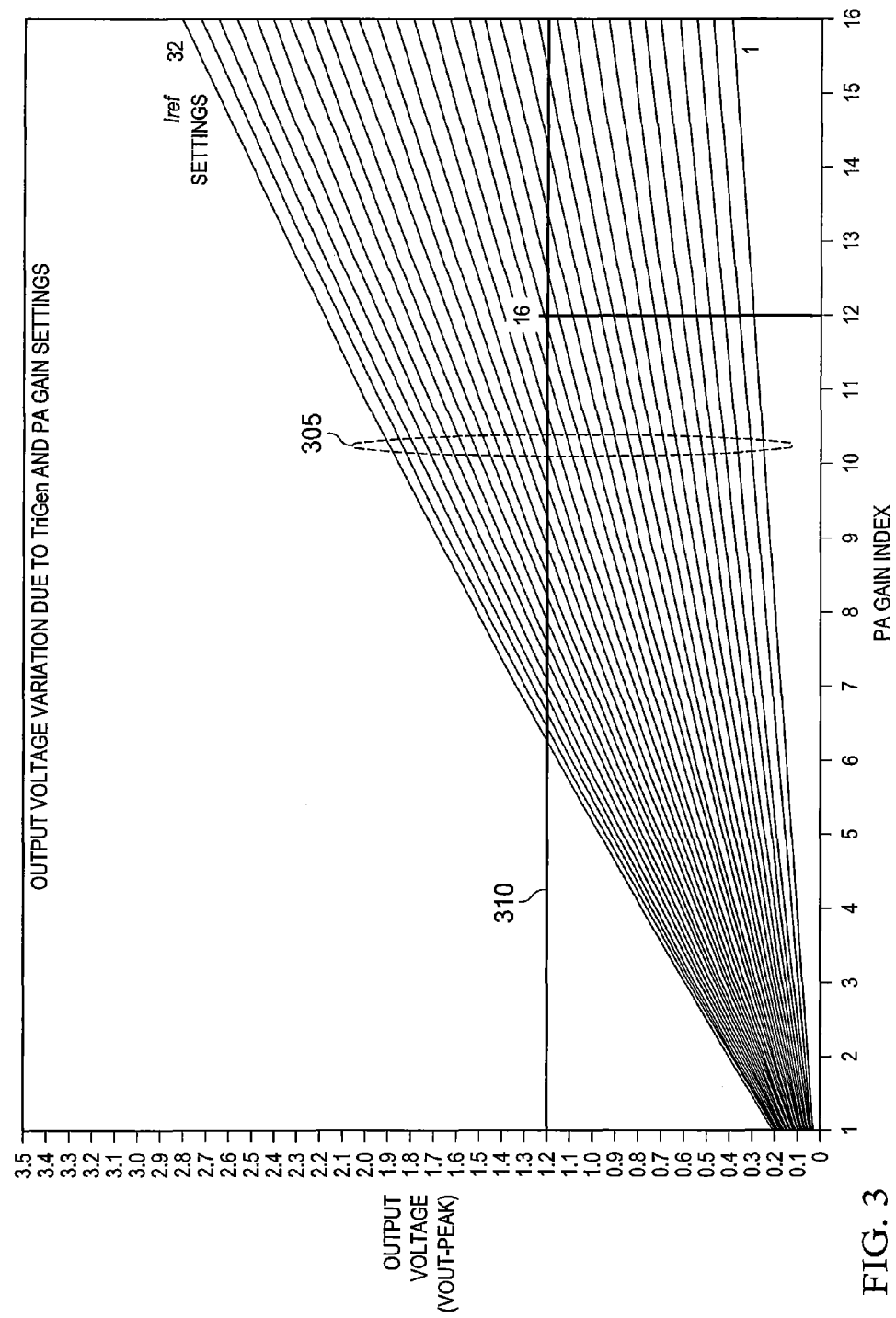
FIG. 3 is a graph of FM power amplifier output voltage swing as a function of power amplifier driver settings during application of an automatic power amplifier tuning method.

FIG. 3 is a graph of FM power amplifier output voltage swing as a function of power amplifier driver settings during application of an automatic power amplifier tuning method. Like FIG. 2, FIG. 3 illustrates a plurality of curves 305 that represent driver finger numbers to be used under various Iref gain settings and power amplifier output levels. Unlike the example of FIG. 2, the example of FIG. 3 pertains to a power amplifier having a total of 16 driver fingers (resulting in 32 curves corresponding to different current settings). As stated above, after the proper driver setting has been initially chosen, the closest Iref setting that satisfies the required voltage level at previously set driver settings is determined. As FIG. 3 shows, the initial Iref setting is the closest setting for the required voltage level with driver setting of 12. If the same process is repeated for a 1.15 V peak output voltage, it can be seen that power amplifier has the same driver setting of 12. If the proper output voltage is between two driver finger settings, one specific embodiment calls for the uppermost of the two settings to be selected so as not to compromise linearity unduly. Therefore, to satisfy the 1.15 V peak output voltage, the proper Iref setting should be 15.

Figure 4B:
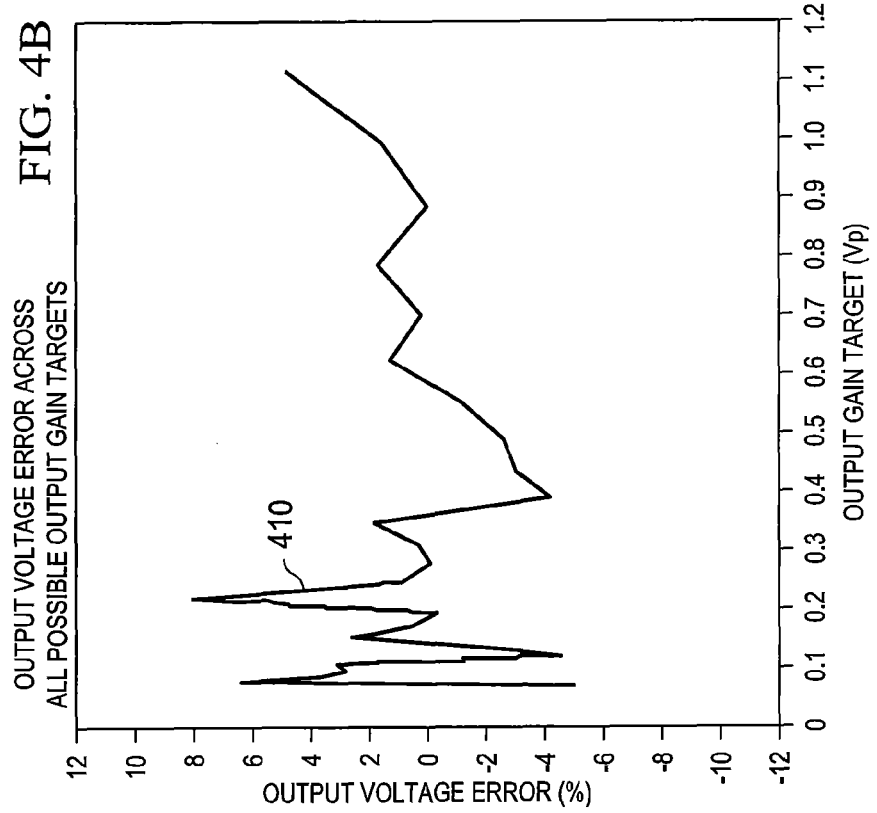
FIGS. 4A and 4B are graphs of target output voltage value and error as a function of output gain after application of one embodiment of an automatic power amplifier tuning method.
Figure 4A:
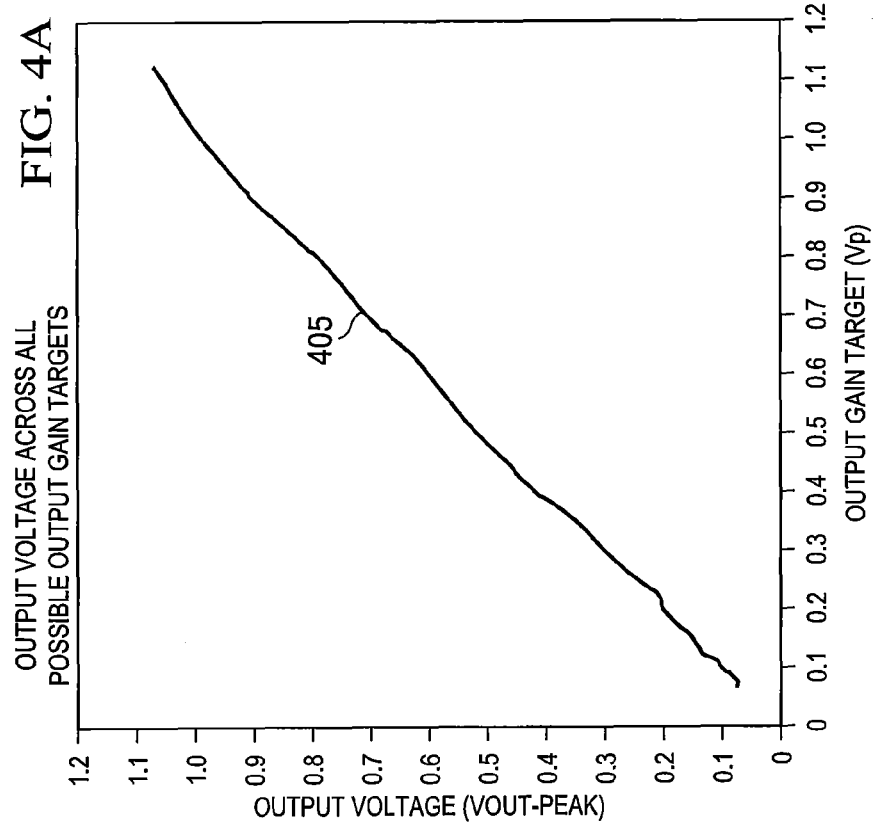

FIGS. 4A and 4B are graphs of target output voltage value and error as a function of output gain after application of one embodiment of an automatic power amplifier tuning method. FIGS. 4A and 4B together show the percentage difference between the target output voltage and achieved output voltage through the automatic power amplifier tuning method. In the illustrated embodiment, the specification for output voltage accuracy is ±12.5%. It is apparent that the automatic power amplifier tuning method has met the specification.

Figure 5:
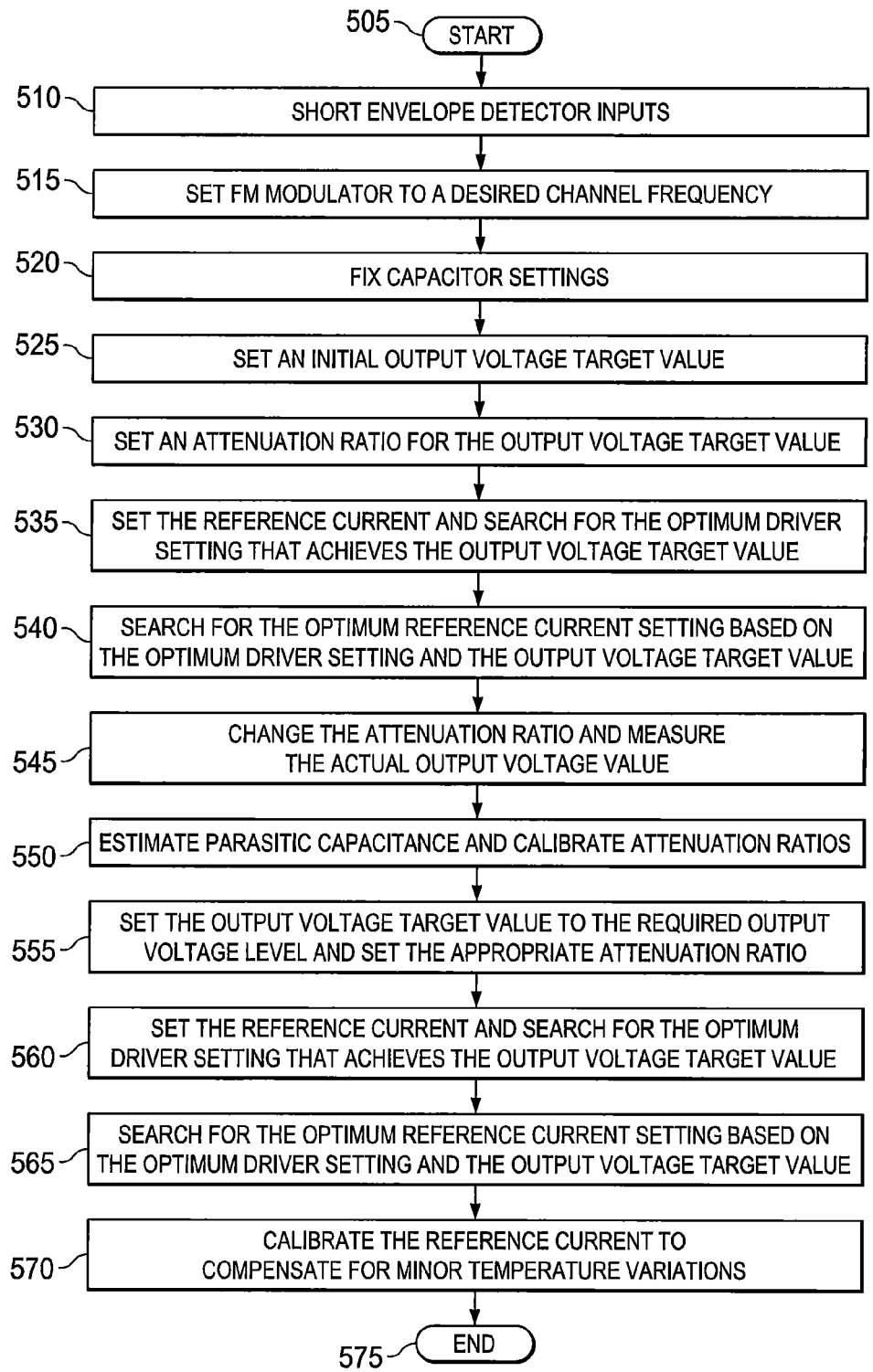
FIG. 5 is a flow diagram of one embodiment of an automatic power amplifier tuning method.

FIG. 5 is a flow diagram of one embodiment of an automatic power amplifier tuning method. The method begins in a start step 505. In a step 510, the inputs of the power detector circuit are shorted together to measure the DC offset of the power detector circuit sense amplifier. In a step 515, the FM modulator is set to a desired channel frequency. No modulation is required. In a step 520, integrator capacitor and matching network capacitor settings are fixed through frequency tuning. In a step 525, an initial output voltage target value is set. In one embodiment, the initial output voltage target value is set to 0.6 V peak voltage. In a step 530, an attenuation ratio is set to the lowest attenuation ratio that can achieve the initial output voltage target value. In a step 535, Iref is set to a middle setting (e.g., Iref=16), and the optimum driver setting is determined (e.g., by searching) to achieve the output voltage target value.

In a step 540, the optimum Iref setting is determined based on the output voltage target value and optimum driver setting found in the step 535. The optimum Iref setting may be determined, e.g., by searching. In a step 545, the attenuation ratio is changed (e.g., by one setting) for the same Iref and driver settings, and the output voltage is measured. In a step 550, the attenuation ratios may then be calibrated by estimating the parasitic capacitance. In a step 555, the target output voltage value is set to the required voltage level, and the attenuation ratio is set appropriately.

The steps 535 and 540 may be repeated as needed. For example, in a step 560, the optimum Iref setting may be determined again based on the output voltage target level and driver setting found in the step 555. In a step 565, the optimum Iref setting may again be determined, e.g., by searching.

In a step 570, if the swing of the external components and antenna impedance by temperature are negligible, overall output voltage swing by temperature is linear, relatively small and can be calibrated, for example, by changing the Iref settings by searching. However, if the swing of the external components and antenna impedance by temperature are not negligible, the automatic power amplifier tuning method may be carried out again. However, as mentioned above, the automatic power amplifier tuning method does not calibrate the power transmitted to antenna; it calibrates the voltage swing across the antenna. If the antenna impedance varies by temperature, the power transmitted to the antenna varies as well even though the voltage across the antenna terminals is constant after the automatic power amplifier tuning method is carried out again.

Those skilled in the art to which this application relates will appreciate that other and further additions, deletions, substitutions and modifications may be made to the described embodiments.

What is claimed is:

1. An automatic power tuning system, comprising:
    a power detector circuit coupled to an output of a transmitter, said transmitter having an integrator with a first, reference integrator current power control input, a second, integrator capacitor power control input and a plurality of driver fingers selectably employable by a third, driver finger power control input, said power detector configured to generate signals indicating an output voltage of said transmitter; and
    a digital processing circuit coupled to said power detector circuit and configured to employ said signals to determine at least near-optimum reference integrator current and integrator capacitor settings and select a number of driver fingers to employ to drive said output voltage.

2. The system as recited in claim 1 wherein said digital processor circuit is further configured to set a modulator of said transmitter to a channel frequency and fix integrator capacitor settings in said transmitter and matching network capacitor settings in said power detector circuit.

3. The system as recited in claim 1 wherein said digital processor circuit is further configured to set an initial output voltage target value and set an attenuation ratio capable of achieving said initial output voltage target value.

4. The system as recited in claim 3 wherein said digital processor circuit is further configured to determine an optimum driver setting to achieve said output voltage target value and determine an optimum reference integrator current setting for said transmitter based on said output voltage target value and said optimum driver setting.

5. The system as recited in claim 1 wherein said digital processor circuit is further configured to short inputs of said power detector circuit together to measure a DC offset of a sense amplifier in said power detector circuit.

6. The system as recited in claim 1 wherein said digital processor circuit is further configured to change said attenuation ratio.

7. The system as recited in claim 1 wherein said digital processor circuit is further configured to calibrate said attenuation ratio by estimating parasitic capacitance of a sense amplifier in said power detector circuit.

8. An automatic power tuning method, comprising:
    setting a modulator of a transmitter to a channel frequency;
    fixing integrator capacitor settings in said transmitter and matching network capacitor settings in a power detector circuit;
    setting an initial output voltage target value;
    setting an attenuation ratio capable of achieving said initial output voltage target value;
    determining an optimum driver setting to achieve said output voltage target value; and
    determining an optimum reference integrator current setting for said transmitter based on said output voltage target value and said optimum driver setting.

9. The method as recited in claim 8 further comprising shorting inputs of said power detector circuit together to measure a DC offset of a sense amplifier in said power detector circuit.

10. The method as recited in claim 8 wherein said setting said attenuation ratio comprises setting said attenuation ratio to a lowest attenuation ratio that can achieve said initial output voltage target value.

11. The method as recited in claim 8 wherein said setting an initial output voltage target value comprises setting an initial output voltage target value to a middle setting.

12. The method as recited in claim 8 further comprising changing said attenuation ratio.

13. The method as recited in claim 8 further comprising calibrating said attenuation ratio by estimating parasitic capacitance of a sense amplifier in said power detector circuit.

14. The method as recited in claim 8 further comprising repeating said determining said optimum reference integrator current setting for said transmitter.

15. A transmitter, comprising:
    a modulator;
    a charge-pump based integrator coupled to said modulator and including a first, reference integrator current power control input and a second, integrator capacitor power control input;
    a notch filter coupled to said charge-pump based integrator;
    a power amplifier coupled to said notch filter, including a plurality of driver fingers selectably employable by a third, driver finger power control input and having an output;
    a power detector circuit coupled to said output and configured to generate signals indicating an output voltage of said power amplifier; and
    a digital processing circuit coupled to said power detector circuit and configured to employ said signals to determine at least near-optimum settings for said first, reference integrator current power control input, said second, integrator capacitor power control input and said third, driver finger power control input.

16. The transmitter as recited in claim 15 wherein said digital processor circuit is further configured to set a modulator of said transmitter to a channel frequency and fix integrator capacitor settings in said transmitter and matching network capacitor settings in said power detector circuit.

17. The transmitter as recited in claim 15 wherein said digital processor circuit is further configured to set an initial output voltage target value and set an attenuation ratio capable of achieving said initial output voltage target value.

18. The system as recited in claim 3 wherein said digital processor circuit is further configured to determine an optimum driver setting to achieve said output voltage target value and determine an optimum reference integrator current setting for said transmitter based on said output voltage target value and said optimum driver setting.

19. The transmitter as recited in claim 15 wherein said digital processor circuit is further configured to short inputs of said power detector circuit together to measure a DC offset of a sense amplifier in said power detector circuit.

20. The transmitter as recited in claim 15 wherein said digital processor circuit is further configured to change said attenuation ratio and calibrate said attenuation ratio by estimating parasitic capacitance of a sense amplifier in said power detector circuit.

* * * * *